United States Patent Office 3,553,798
Patented Jan. 12, 1971

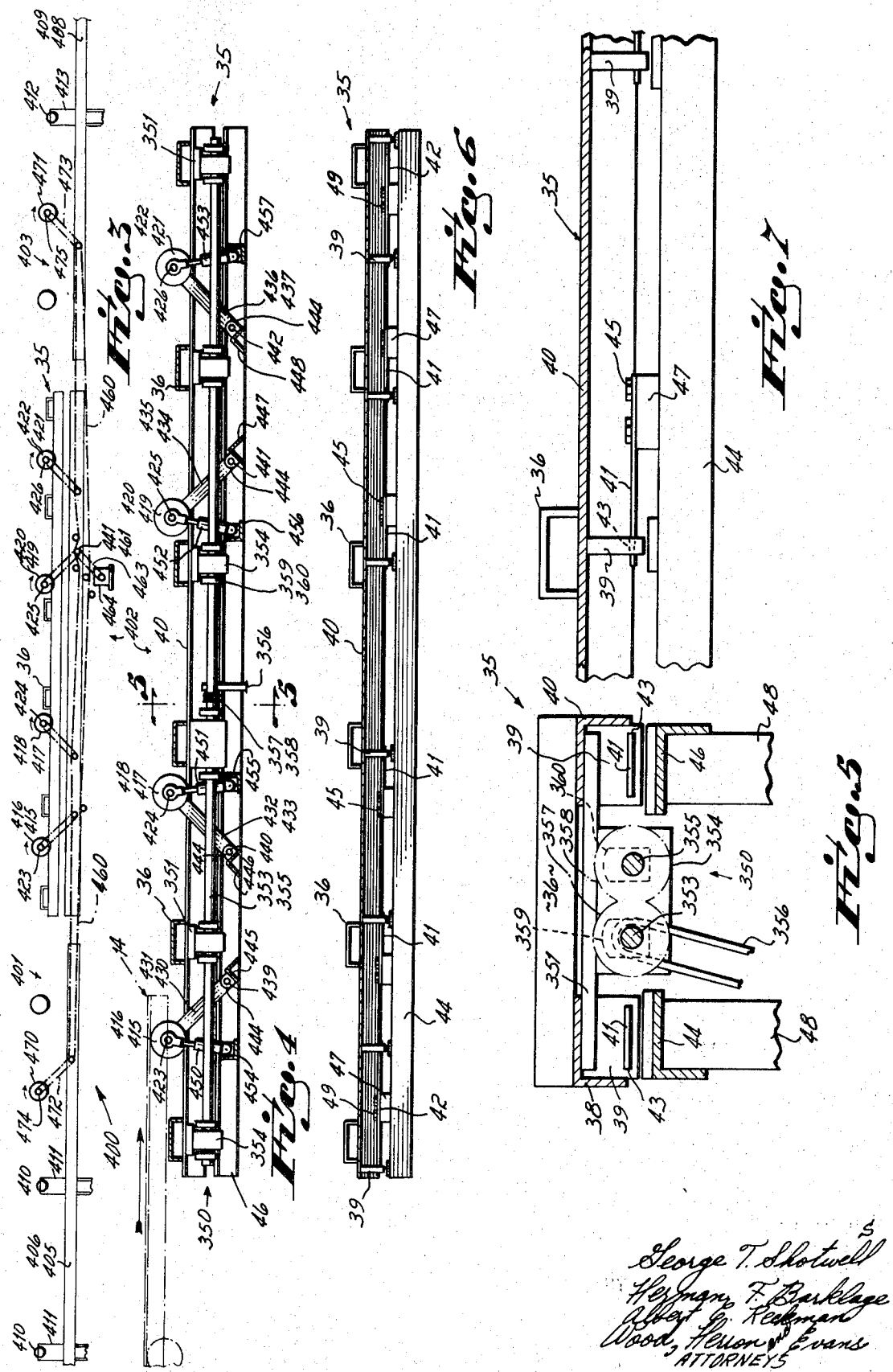

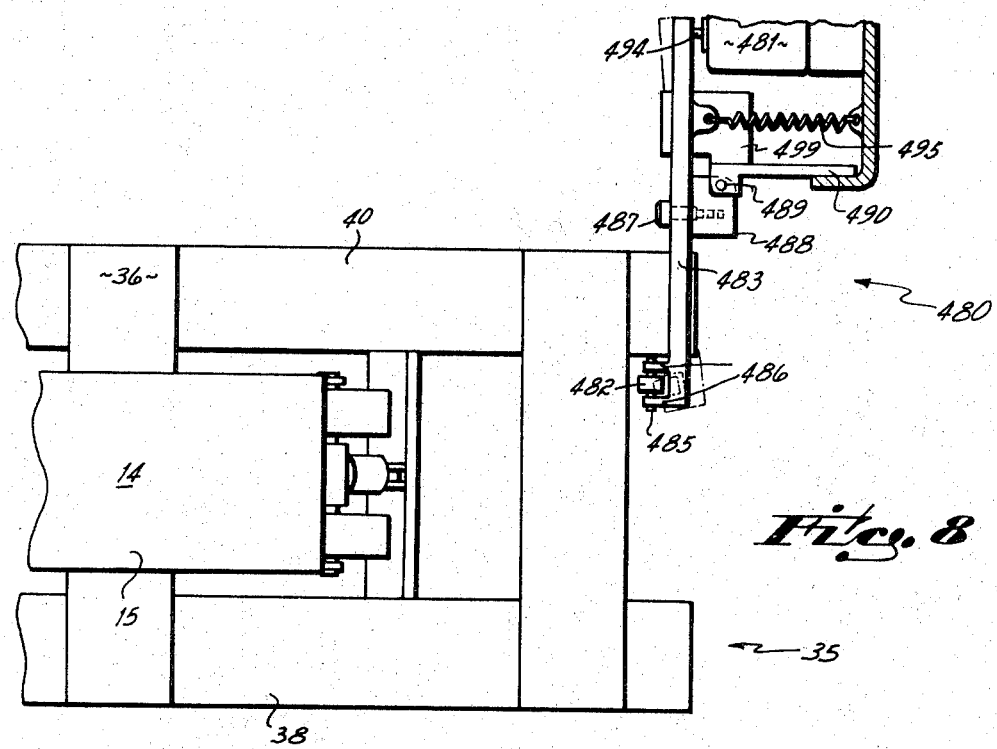
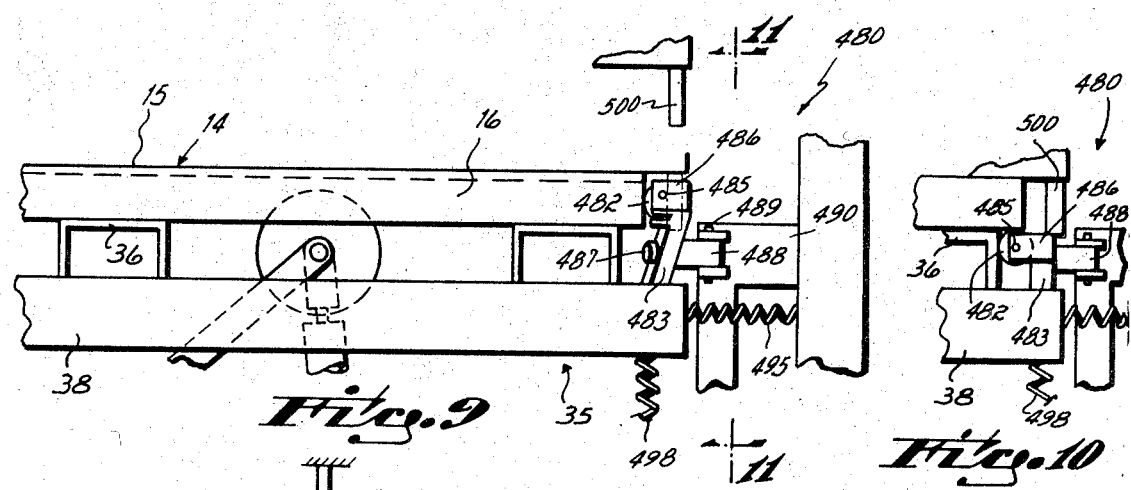
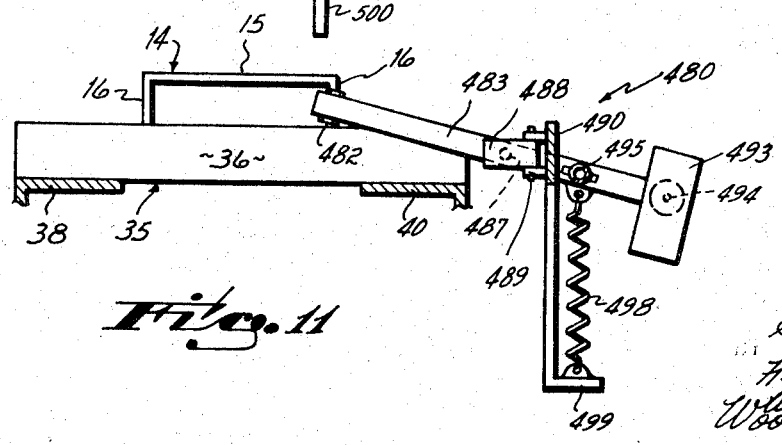

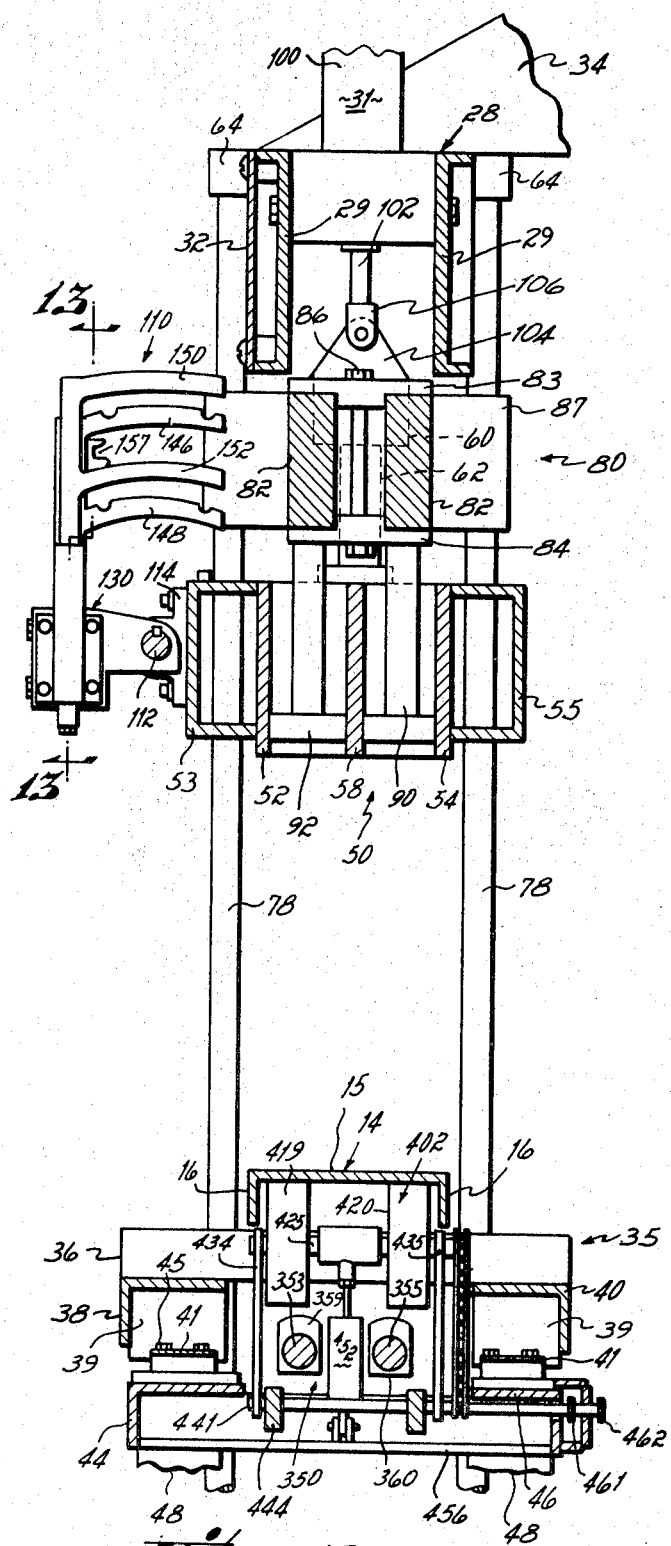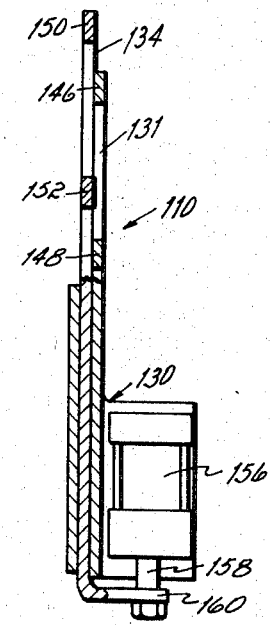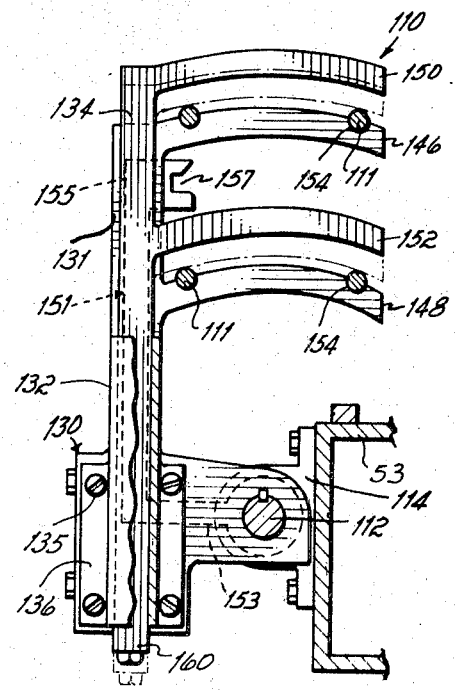

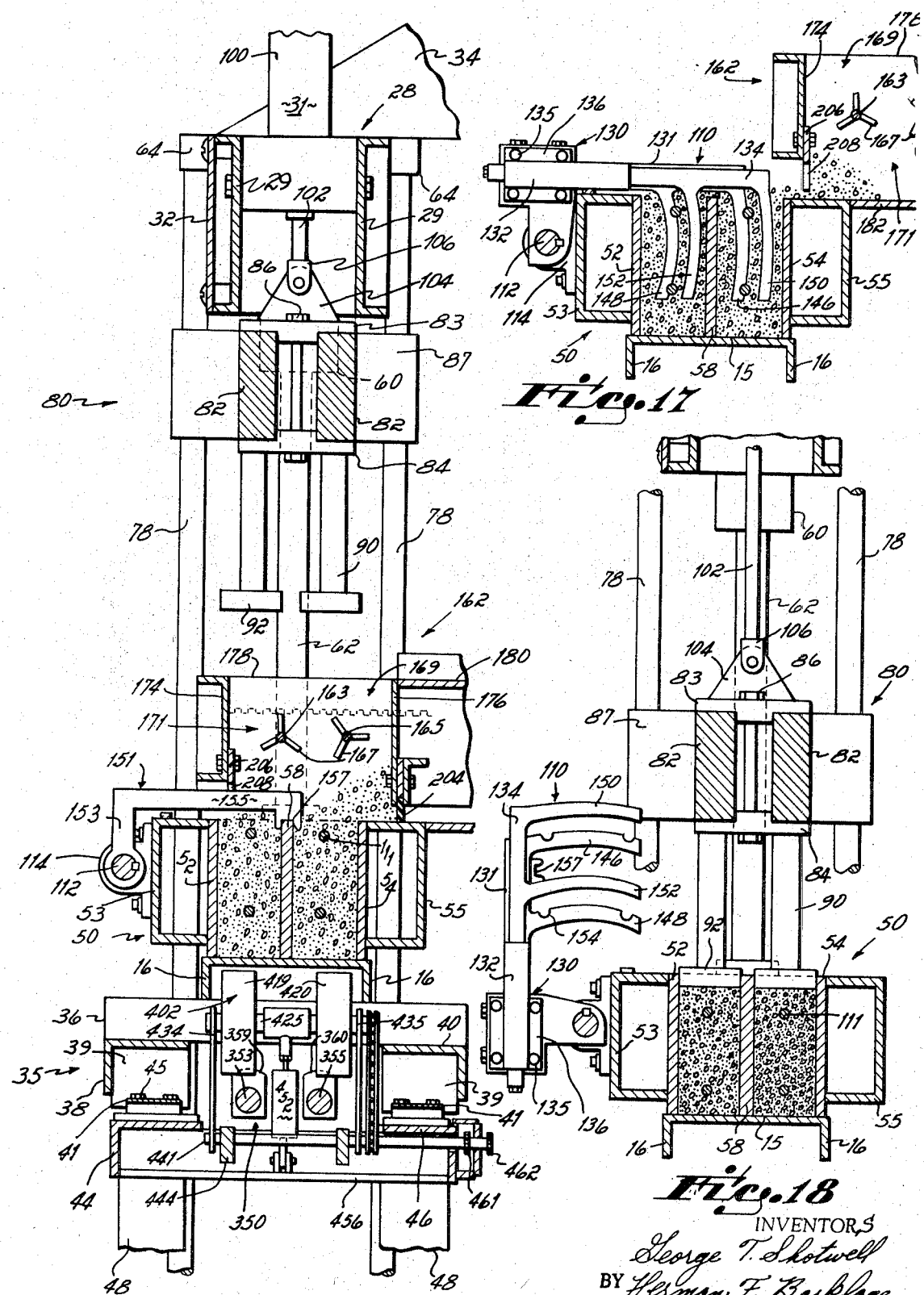

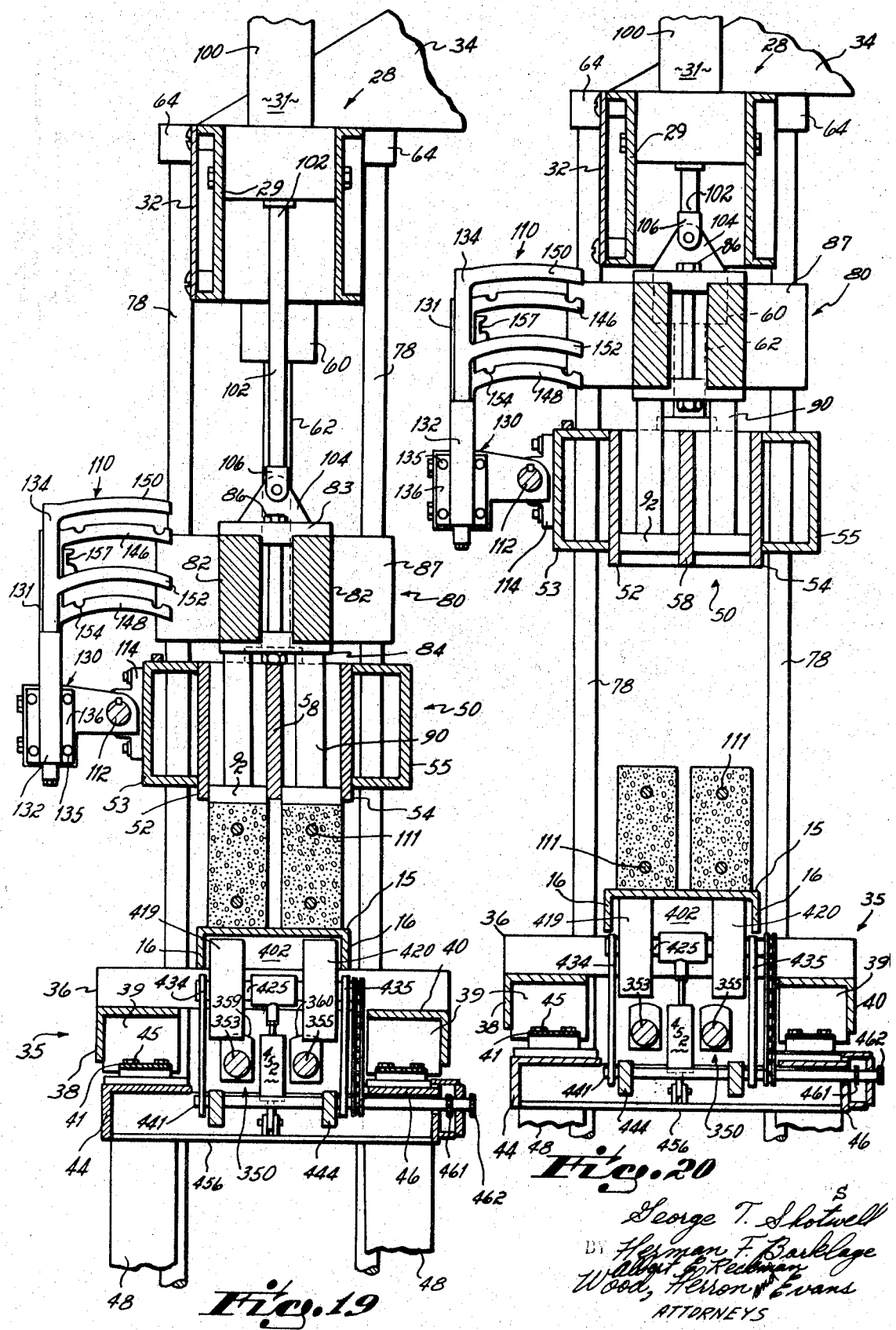

3,553,798
APPARATUS FOR PRODUCING PRECAST CONCRETE MEMBERS
Albert C. Reckman and Herman F. Barklage, Cincinnati, Ohio, and George T. Shotwell, Covington, Ky., assignors to A. R. Industries, Inc., a corporation of Ohio
Filed Jan. 2, 1968, Ser. No. 694,725
Int. Cl. B28b 7/24
U.S. Cl. 25—41                                       32 Claims

ABSTRACT OF THE DISCLOSURE

A machine for manufacturing precast reinforced concrete structures by feeding a supporting platen beneath a movable mold box, lowering the mold box onto the platen, locating reinforcing rods within the mold box, filling the mold with concrete mix, compacting and sizing the mix within the mold, removing the mold, and feeding the pallet and molded product out of the machine.

BACKGROUND OF THE INVENTION

Numerous reinforced concrete products are manufactured by a precasting process. Such products are shipped to building sites as prefabricated elements. Examples of such products are lintles, highway guard posts, parking lot bumpers, railroad ties, etc. To manufacture these precast concrete structures, a hydrated loose mixture of coarse aggregates, water and portland cement is premixed and then dumped into the mold where it is compacted into a unitary structure. The water in the mixture is just sufficient to activate the powdered cement and is insufficient to render the mass fluid or flowable so that the compacted structure may be immediately removed from the mold before the cement sets.

In pending U.S. patent application Ser. No. 503,792, filed Oct. 23, 1965, now Pat. No. 3,407,458 issued Oct. 29, 1968, assigned to the assignee of this application, there is disclosed a concrete casting machine of the general type to which the invention of this application is applicable. Specifically, that application discloses a machine for manufacturing precast reinforced concrete structures. The machine comprises a vertically movable mold box which is lowered onto a manually fed pallet prior to the filling of the mold with concrete mix. Rod supports mounted on the machine are operable to place reinforcing rods into the mold box and hold them in place while the mold is filled with mix. The mix is fed into the mold by an open bottom feed drawer which is operable to transport mix from a concrete mix hopper to the mold box. During and after filling of the mold box, the machine vibrates the pallet and mold so that the mix compacts in the mold and around the reinforcing rods. After filling of the mold, the feed drawer is moved rearwardly to strike off the top of the mold. While the vibration continues, a sizing and compacting ram is forced downwardly so as to evenly compact the concrete product and size it to a preselected vertical dimension. After compaction and sizing, the mold box is lifted vertically while the ram is held stationary in engagement with the top of the product so that the precast concrete product is stripped from the mold by the ram and left on the pallet ready for removal to a curing room.

While the machine described hereinabove is generally superior to all other commercially available equipment for manufacturing precast reinforced concrete structures, we have found that a superior product may be manufactured by incorporation into the machine of the improvements which are the subject of this invention.

Specifically, we have found that the addition of an automatic conveyor for supplying pallets to the machine and removing palletized products from the machine results in fewer rejects and less breakage of the products during handling. Consequently, one objective of this invention has been to provide an automatic pallet conveyor for supplying pallets to the machine and transferring palletized products out of the machine.

The invention of this application also incorporates a unique stop for limiting movement of the pallets through the machine and stopping them in a predetermined location within the machine. At the completion of the molding process, the stop is automatically pushed aside so that the conveyor drive is free to transfer the pallet and palletized product out of the machine.

Another aspect of the invention of this application resides in a unique mounting for the pallet support table which limits vibrational movement of the table to a vertical plane. Only vertical movement of the support affects compaction so that it is desirable to limit the vibrational movement of the table to this plane. Lateral or transverse movement simply wastes energy input into the machine, expedites wear of the machine and creates voids in the mold box.

The unique table mounting comprises a series of cantilever type springs either rigidly connected at one end or medially of the ends to the machine frame and connected at the free ends to the vibratable table.

To further isolate table vibration from the stationary frame of the machine, the invention of this application incorporates a unique support of the mold box. Specifically, this support comprises a dove-tailed slide interfit between the mold box and a vertically movable mold box support slide. This vertical dove-tailed slide interfit permits the mold box to vibrate or move vertically relative to and independently of the slide so that the vibration is further isolated from the machine frame.

Another feature of the machine which contributes to the improved product produced thereon includes a dual shaft vibrating system in which the shafts are interconnected by gears operable to maintain synchronization of the dual shafts.

Another improvement of the machine of this application resides in the relocation of the sizing ram stops. We have found that product sizing is more consistent and quality control is improved when the ram stops are located on the pallet support table rather than the machine frame. With the stops so located, the ram always stops its downward movement at a predetermined height above the top of the table, or the bottom of the pallet, irrespective of the position of the table when the vibrating movement is terminated.

Another aspect of the invention of this application resides in the addition to the machine of divider holders. Heretofore, when a mold box was divided by a longitudinal wall to enable multiple discrete products to be simultaneously formed in the fold, flexure of the wall during filling of the box resulted in an imperfectly sized product. This flexure of the wall occurs because the rearwardmost half of the mold box is filled first with mix and then the front half. Filling of the rearward half of the mold box before the front half causes the divider wall to flex and hold this flexure throughout the molding process. We have found that this flexure can be very simply avoided by mounting divider wall holders on the rod holder support shaft so that the divider wall holders move into engagement with the top of the divider wall simultaneously with the placement of reinforcing rods into the mold box. These divider wall holders then restrain the wall against flexure during filling of the mold.

These and other objects and advantages of this invention will be more readily apparent from the following description of the drawings in which:

FIG. 3 is a partially diagrammatic illustration of the pallet conveyor of the machine taken along line 3—3 of FIG. 1.

FIG. 4 is a cross-sectional view through the pallet conveyor of the machine.

FIG. 5 is a cross-sectional view through the pallet support table and vibratory table drive.

FIG. 6 is a cross-sectional view through the pallet support table illustrating the manner of mounting the table to facilitate vibratory table movement.

FIG. 7 is an enlarged cross-sectional view of a portion of the table support of FIG. 6.

FIG. 8 is a top plan view of the pallet stop mechanism.

FIG. 9 is a side elevational view of the pallet stop mechanism of FIG. 8 showing the pallet stop in a blocking position relative to a pallet on the conveyor.

FIG. 10 is a side elevational view of the pallet stop illustrating the stop in a nonblocking position relative to a pallet on the machine conveyor.

FIG. 11 is a cross-sectional view through the pallet stop taken on line 11—11 of FIG. 9.

FIG. 12 is a cross-sectional view through the precaster machine taken in line 12—12 of FIG. 1.

FIG. 13 is a cross-sectional view through a rod holder taken on line 13—13 of FIG. 12.

FIG. 14 is an enlarged cross-sectional view partially broken away of the rod holder of FIG. 12.

FIG. 16 is a cross-sectional view of the machine similar to FIG. 12 illustrating the positioning of the mold box, rod holders and concrete mix feed drawer during filling of the mold box.

FIG. 17 is a cross-sectional view through the mold box and rod holders after strike off of the mold box and after opening of the rod holder support fingers to release the reinforcing rods.

FIG. 18 is a cross-sectional view similar to FIG. 12 but illustrating the positioning of the rod holders and the sizing and compaction ram during final sizing and compaction of the concrete mix in the mold.

FIG. 19 is a cross-sectional view similar to FIG. 12 but illustrating the positioning of the sizing ram, mold box and rod holders during removal of the precast concrete product from the mold box.

FIG. 20 is a view similar to FIG. 19 but illustrating the location of the machine components after completion of the molding cycle and preparatory to removal of a precast concrete product and supporting pallet from the machine on the machine conveyor.

Figure 1:
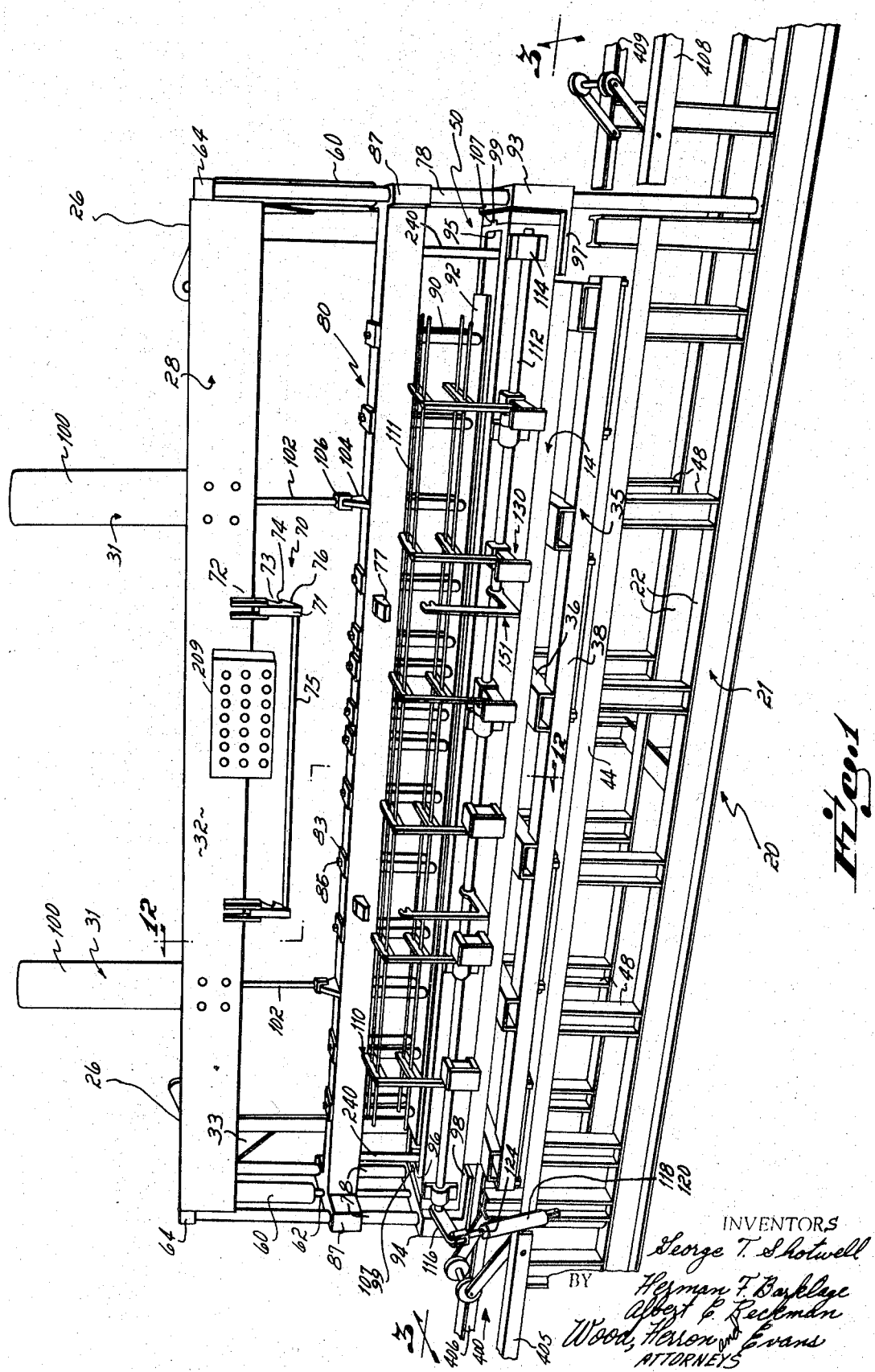
FIG. 1 is a front perspective view of a concrete precasting machine incorporating the invention of this application.
Figure 2:
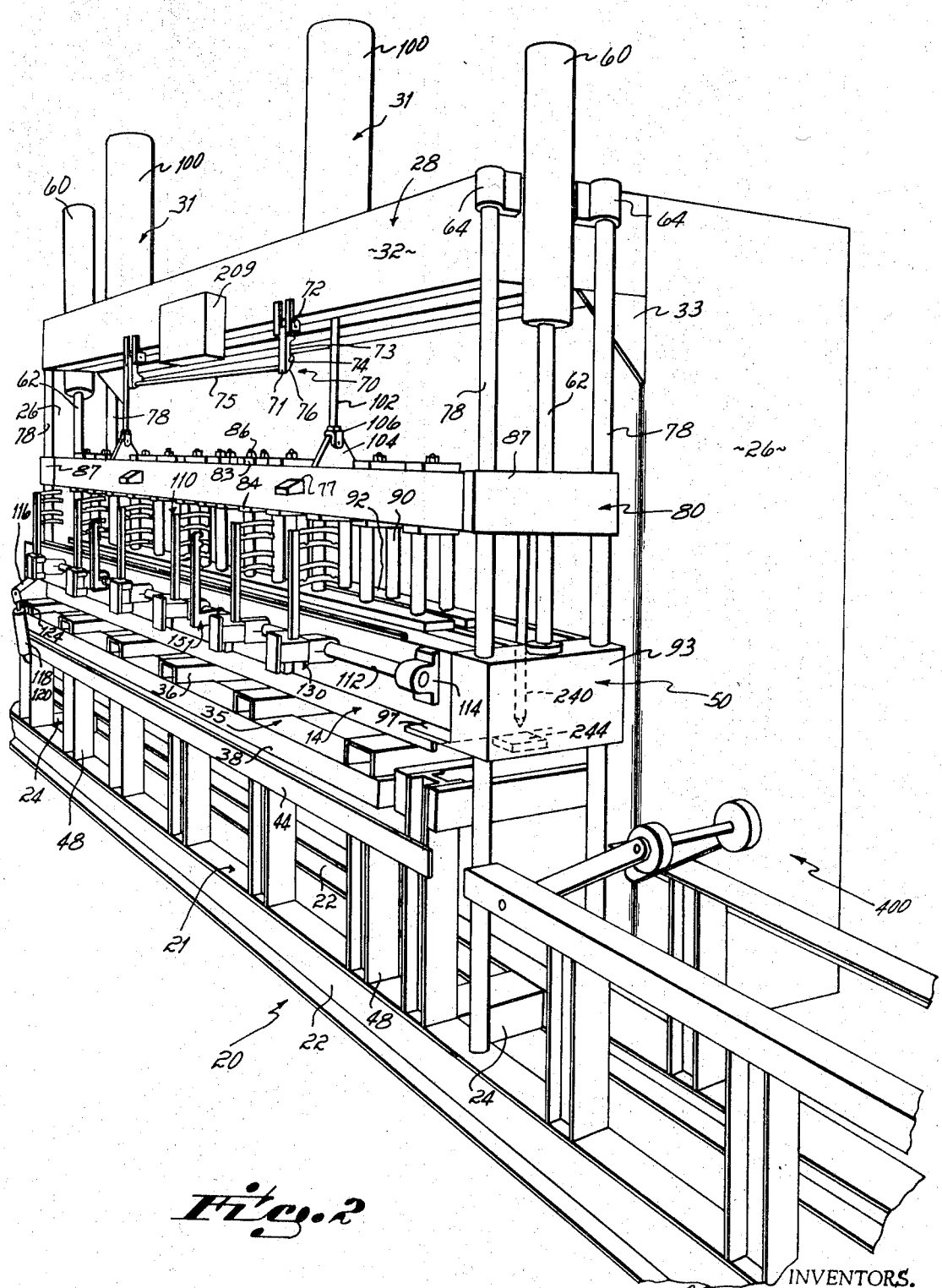
FIG. 2 is a front and side perspective view of the machine of FIG. 1.

Referring first to FIGS. 1 and 2, the numeral 20 has been used to designate a machine frame comprising a base 21 having a pair of spaced longitudinal channels 22 interconnected by transverse beams 24. A pair of laterally spaced vertical side plates 26 are secured to the two transverse beams 24 at the ends of the machine. The side plates are interconnected or tied together at their upper ends by a horizontal beam assembly 28.

As may be seen most clearly in FIG. 12, the horizontal beam assembly 28 comprises a pair of safe channels 29 between which are clamped ram motors 31. A cover plate 32 is bolted between the flanges of the forwardmost channel 29 so as to form a cover plate over the front of the assembly. The channels are supported from their lower side by a pair of corner gusset plates 33 (FIG. 1) and from the top by upper gusset plates 34.

A pallet support or table 35 extends for the length of the machine beneath the upper beam assembly 28. This table 35 comprises a plurality of transverse channels 36 supported from a pair of front and rear angle irons or beams 38 and 40. As best shown in FIG. 6, each of these beams 38, 40 has eight equidistantly spaced depending support blocks or legs 39 welded to its lower or bottom side. These supporting legs 39 connect the upper angle irons 38 and 40 to a pair of lower angle irons 44, 46, respectively, through a series of resilient mountings or leaf springs 41, 42. These leaf springs are of two types: cantilever supported leaf springs 41 located medially of the ends of the angle irons and dual end supported leaf springs 42 located at the ends of the angle irons. The cantilever mounted leaf springs 41 extend at their free ends through transverse horizontal slots 43 in the mounting blocks 39 and are secured by bolts 45 to supporting blocks 47 welded or otherwise fixedly secured to the tops of the lower angle irons 44 and 46. The leaf springs 42 at the ends of the angle irons have their opposite ends extending through transverse slots 43 in the two endmost supporting legs 39 of the upper angle irons 38 and 40 and are bolted medially of their ends by bolts 49 to the endmost supporting blocks 47. The lower angle irons 44, 46 are welded or otherwise fixedly secured to the tops of vertical posts 48 which are in turn welded or fixedly secured at the bottom to the base channel beams 22. Thus, the resilient leaf springs 41, 42 are interposed between the vibratable pallet support 35 and the stationary base 21 of the machine frame 20. As a result, the pallet support is free to move or vibrate relative to the base or frame of the machine without imparting vibration of the table 35 to the frame.

Vibration of the pallet support or table 35 is derived from a vibrator 350 mounted on the underside of the pallet support 35. It comprises a series of six cross plates 351 welded or otherwise fixedly secured to the bottoms of the longitudinal beams 38 and 40 below the transverse channels 36. Upon the bottom of these plates are bolted a series of spaced journal blocks 354 within which a pair of shafts 353, 355 are rotatably mounted. One shaft 353 is driven at a high rotational speed by an electric motor (not shown) through a drive belt 356. The other shaft 355 is driven from the first shaft 353 through mating gears 357, 358 secured to each of the shafts. Rotation of these shafts effects rotation of eccentric weights 359, 360 secured to the shafts 353, 355, respectively, so that high frequency vibrational movement is imparted to the pallet support table 35.

Twelve weights are located on each shaft, each weight being positioned closely adjacent to one side of one of the journal blocks 354 so that flexing and whipping of the shaft during rotation is minimized. As may be seen most clearly in FIGS. 4 and 12–20, all of the weights on each shaft 353 are located on the same side of the shaft. When in the vertical plane, the weights on both shafts are on the same side of the shafts. In other words, when the weights of one shaft are located above the shaft, the weights on the other shaft are similarly located above the shaft. The geared drive maintains this orientation of the weights on the shafts. Additionally, the geared drive causes one shaft to rotate clockwise while the other rotates in a counterclockwise direction so that the weights point in opposite directions when located in the horizontal plane. Consequently, the horizontal force vectors created by the rotating eccentric weights on the opposite shafts cancel each other and minimize horizontal vibration of the table.

The pallets upon which the products are molded each comprise an elongated channel iron having a flat top plate 15 from which depend side walls 16. Each pallet is adapted to spanningly engage the various channel members 36 when located within the machine and supported upon the vibratable table 35.

Pallets are conveyed into and out of the machine upon a pallet conveyor 400 which comprises three sections; an infeed section 401, a machine transfer section 402 and a feedout section 403. Both the infeed and feedout sections of the conveyor extend beyond the end of the machine and are supported upon extensions of base support beams 22 of the frame.

Referring to FIGS. 1 and 3, it will be seen that the infeed section 401 of the conveyor 400 comprises a pair of upper support rails 405, 406 mounted on top of vertical posts 48 which are in turn supported from the base support beams 22 of the machine frame. Similarly, the feedout section 403 of the conveyor comprises a pair of transversely spaced support rails 408, 409 supported from the base 21 by other vertical posts 48.

The horizontal infeed conveyor 401 is operable to feed pallets into the machine upon rotation of a series of drive rolls, as is explained more fully hereinafter. In moving into the machine over the conveyor, the pallets pass over a series of rollers 410 supported upon vertical legs 411 attached to the side rails 405, 406 of the conveyor. Similarly, in passing out of the machine, the pallets roll over a series of rotatable rollers 412 supported upon vertical legs 413 attached to the side rails 408, 409 of the feedout conveyor.

Drive to the pallets over the conveyor 402 is imparted by a series of vertically movable and rotatably driven rolls 415, 416, 417, 418, 419, 420, 421 and 422. These drive rolls are mounted in pairs upon drive shafts 423, 424, 425 and 426 to which they are keyed so that rotation of the shafts effects rotation of the drive rollers. The rollers of each pair are spaced apart a distance less than the width of a pallet and less than the dimension between the depending legs 16 of each pallet so that the legs are located outside the rollers and serve to prevent the pallets from rolling off the rollers in passing over the conveyor.

Each drive shaft 423, 424, 425, 426 is rotatably supported between the outer upper ends of a pair of support brackets 430–437. The lower ends of these brackets are pivotally connected to supporting shafts 439–442 which are in turn rotatably supported within apertured lugs 444 fixed to transversely oriented beams 445–448 that extend between the longitudinally extending frame support rails 44, 46. This mounting of the brackets and the drive roll supporting shafts 423, 426 enables the rollers to be moved vertically by four expansible chamber hydraulic motors 450–453. The bottom of the cylinder of each of these motors is pivotally secured to a transverse bar 454–457 while the upper end of the piston of each motor is pivotally secured to one of the drive roll supporting shafts 423–426. Consequently, upon extension of the motors 450–453, the drive rollers may be raised to an extended position in which the rollers support the pallets above the transverse rails 36 of the table 35. In the lowered position (FIG. 16), the rollers are beneath the pallet so that it rests upon and is supported solely by the transverse rails 36.

Rotational drive to the rollers 415–422 is effected by a chain and sprocket drive to each of the roller support shafts 423–426 from the supporting shafts 439–442. As may be seen most clearly in FIG. 12, the rear end of each of the shafts 423–426 has a sprocket drivingly keyed thereto. Similarly, a drive sprocket is keyed to each of the pivot shafts 439–442. A chain interconnects the sprockets of each of the shafts 423–426 to the pivot shafts 439–442, respectively. As may be seen most clearly in FIG. 3, the shafts 439, 440, 441 and 442 are all drivingly interconnected by an endless chain 460 which passes over and is operative to drive sprockets 461 secured to each of the shafts 439–442. The chain 460 is driven by a sprocket 462 drivingly keyed to the shaft 441. The sprocket 462 and shaft 441 are in turn driven by a chain and sprocket drive 463 from a hydraulic motor driven drive unit 464.

In addition to the sprockets 461 attached to the shafts 439–442, the drive chain 460 is also operative to drive a pair of drive rollers 470 of the infeed conveyor and a pair of drive rollers 471 of the feedout conveyor. These rollers 470, 471 are driven from the chain 460 through a chain and sprocket drive 472, 473, respectively. The rollers 470, 471 are drivingly keyed to support shafts 474, 475 which are mounted at a fixed position upon support brackets (not shown) similar to brackets 411 and 413.

Actuation of the motor drive 464 for the pallet conveyor is controlled by a stop mechanism 480 and associated control switch 481. This stop mechanism is located in the path of travel of a pallet on the conveyor so that in passing through the machine the pallet engages a roller abutment 482 of the stop mechanism and moves the abutment to open the switch and thereby open a control circuit to the electric motor 464.

As may be seen most clearly in FIGS. 8 through 11, the stop mechanism 480 is attached to the frame side plate 26 of the machine at the downstream end of the conveyor. The abutment roller 482 of the stop mechanism 480 is attached to one end of an arm 483 which extends forwardly from the frame plate 26 over the pallet conveyor 400. This roller is rotatably supported upon a pin 485 which is supported between legs 486 on the forward end of the arm 483. Medially of its ends, the arm 483 is pivotally supported upon a post 487 of a pivot block 488. The block 488 is in turn pivotally mounted upon a vertically extending pivot pin 489 which is in turn supported within a fixed bracket 490 secured to the frame side plate 26. Thus, the arm 483 is free to move horizontally about the vertical pin 489 and is free to pivot in a vertical plane about the horizontal pivot pin 487.

A large switch actuating plate 493 is secured to the rear of the arm 483. This plate is movable to and from a position in engagement with the actuator 494 of the switch 481 so as to move the switch between an opened and closed position, depending upon whether the abutment roller 482 is in engagement with a pallet on the conveyor. Normally, the cross bar 483 is biased into a position in the path of movement of a pallet on the conveyor. When out of engagement with a pallet, the arm is held or biased in a position in contact with the switch actuator 494 so that the switch is held closed. This bias is provided by a tension spring 495 secured at one end to the cross bar 483 and at the opposite end to the frame side plate 26. The spring 495 is operative to pull the cross bar toward the frame 26. A second spring 498 (FIG. 11) is operative to bias the forward end and the abutment roller 482 to a raised position in the path of movement of a pallet on the conveyor. This spring is attached at one end to the cross bar 483 and at the opposite end to a depending flange 499 of the supporting bracket 490.

In operation, the abutment roller 482 is normally located in the position illustrated in FIGS. 8, 9 and 11 in which the abutment roller is in an elevated position in the path of movement of a pallet on the conveyor and in which the rear end plate 493 of the cross bar is contacting and holding the switch 481 in a closed position. Upon engagement of a pallet with the roller 482, the pallet causes the roller 482 to move to the right as viewed in FIG. 8, thereby opening the switch 481 by moving the rear plate 493 away from the actuator 494. Opening of this switch opens the control circuit to the drive motor 464, thereby stopping the rotation of the drive rollers so as to leave the pallet in position for the molding operation over the pallet support table 35 of the machine. In addition to stopping rotation of the drive rollers upon opening of the switch 481, a second control circuit (not shown) energizes a solenoid valve to effect actuation of the expansible motors 450–453 so as to cause the motors to pull the rollers 415–422 downwardly and lower the pallet onto the table 35. The abutment roller 482 and the stop mechanism remain in this condition until the mold box of the machine moves downwardly during the molding process. In moving downwardly, a lug 500 secured to the bottom of the box (FIGS. 9 and 10) engages the forward end of the roller support arm 483 and moves it downwardly against the bias of the spring 498. When the box is all the way down and resting upon the pallet, the roller 482 is forced downwardly until it is located beneath the pallet, in which position the spring 495 is operative to pull the rear end of the arm toward the switch while the forward end of the arm moves under the pallet. This movement of the arm results in closing of the switch 481 so that the control circuit (not shown) is conditioned for activation of the drive rollers 415-422 upon completion of the molding process.

The numeral 50 generally denotes the mold box which is open at its top and bottom and comprises a rigid, unitary horizontal frame including front 52, rear 54 and opposed end walls 56. In the preferred embodiment illustrated and described herein, the mold box includes an intermediate divider wall 58 operable to divide the box longitudinally so that at least two separate and discrete concrete products are simultaneously molded in the front and rear halves of the box. To further rigidify the box, the front and rear walls are preferably reinforced by parallel channel members 53 and 55, respectively.

The mold box is vertically reciprocal between the fully elevated, nonoperative position of FIGS. 12 and 20 to the fully lowered positions of FIGS. 1, 15, 16, 17 and 18. In the lowered position of the mold box, the bottom face is in contacting relationship with the upper surface 15 of a pallet so that the mold box and pallet together define a molding chamber open only at its top.

Vertical movement of the mold box 50 is effected by means of a pair of hydraulic motors 60 operable to move a pair of mold box supporting slides 93, 94 located at opposite ends of the machine. The end plates 95, 96 (FIG. 1) of the mold box rest upon lower platforms 97, 98 of these slides so that the mold box moves vertically with the slides. To facilitate vertical vibratory movement of the mold box without a corresponding movement of the slides, both slides have an inwardly extending vertical tongue 99 engageable in a slot 107 of the mold box end plates 95 and 96 so that the end plates and consequently the mold box may move vertically independently of the slide.

The mold box supporting slides 93, 94 are each movable over a pair of guide bars 78 secured to opposite ends of the machine between the cross beam 28 and base 81. Brackets 64 secured to the ends of the cross beam 28 support the upper ends of each pair of guide bars 78 while the lower ends of the bars are welded or otherwise rigidly secured to the base 21.

The numeral 80 denotes generally a vertically reciprocal combination ram head and stripper plate assembly which, in the preferred embodiment, includes a pair of elongated side bars 82 and top and bottom elements 83 and 84, respectively. The top and bottom elements are secured together by bolts 86 so as to sandwich the side bars 82 therebetween in a unitary assembly. The opposite ends of the ram assembly are rigidly secured to apertured yokes 87 which slidably engage the vertical guide bar 78. A plurality of depending legs 90 are secured to and carried by the bottom elements 84. The lower ends of the depending elements carry rigid pads 92 having smooth lower surfaces. If desired, the pads 92 may be secured to elements 90 by means of bolts to permit interchanging the pads or they may be permanently secured to these elements. The pads 92 are dimensioned to make a loose sliding fit with the open upper ends of the mold boxes, as hereinafter more fully explained.

Vertical movement of the combination ram head and stripper plate assembly 80 is accomplished by the hydraulic motors 31, each of which comprises a cylinder 100 having a piston rod 102 pivotally secured to a bracket 104 by a bifurcated member 106. The brackets 104 are welded or otherwise secured to the top plate element 83 of the ram assembly 80 so that vertical movement of the piston rod 102 and attached bracket 104 controls vertical displacement of the combination ram head and stripper plate 80.

A safety latch 70 is preferably provided for precluding accidental or unintentional lowering of the ram head or stripper plate assembly. As may be seen in FIGS. 1 and 2, this latch comprises a pair of levers 71 pivotally depending, as at 72, from the front of the cross beam assembly 28 of the frame. The lower ends of these levers 71 are notched so as to define a generally hook-shaped end 73 which provides a bearing surface 74 engageable under clips or blocks 77 mounted upon the front of the ram assembly 80. The levers 71 are interconnected by an actuator bar 75 which may be grasped by an operator for effecting disengagement of the latch from the ram head and stripper plate assembly. The bottoms of levers 71 are inclined as at 76 to provide a surface which will automatically be swung out of interfering relationship with the ram stripper assembly incident to movement of the assembly to its fully elevated position. The latch lever 71 automatically seeks the latching position after the ram stripper assembly has been raised into its fully elevated position as a result of gravity forcing the latch lever into the hooking or latched position of FIGS. 1 and 2 under the clips or blocks 77 of the ram stripper assembly.

The machine of this invention includes a reinforcing rod placement assembly indicated generally by the numeral 110. The assembly is mounted on the front side of the box 50 so as to be vertically movable with the box. It includes a main shaft 112 supported within journal blocks 114 bolted to the front channels 53 of the mold box. Rotational displacement of the main shaft 112 through an angular arc of approximately 90° is controlled by a crank arm 116 nonrotatably keyed to one end of the shaft 112 (see FIG. 2). Movement of the crank arm 116 is in turn controlled by a hydraulic motor 118. This motor 118 includes a cylinder 120 pivotally connected at its lower end to a frame post 48. The piston 124 of motor 118 is pivotally secured at its end to the free end to the crank arm 116. As shown in FIGS. 1 and 2 when the crank arm is in its retracted position with the piston rod 124 within the cylinder, the reinforcing rod support assembly 110 is in its raised position. When the piston rod is extended to its outer limit, the bell crank 116 rotates through approximately 90° and thus rotates shaft 112 through a similar arc.

As may be seen most clearly in FIG. 1, six support blocks 130 are equally spaced along main shaft 112. These blocks are nonrotatably keyed to the shaft so that rotation of the shaft results in rotation of the blocks.

Referring to FIGS. 1, 12, 13 and 14 it will be seen that each of the blocks 130 supports a channel-shaped arm 132 within which an actuating member 134 is longitudinally slidable. The actuating member 134 is maintained in the channel of the arm 132 by bolts 135 which extend through flanges 136 and thus secure the arm 132 and retained members 134 against the supporting block 130.

As may be seen most clearly in FIGS. 13 and 14, spaced parallel and stationary fingers 146, 148 extend outwardly toward the mold box from an arm 131 of the block 130. These fingers are generally arcuate in configuration and have a radius equal in length to the distance from the center of the main shaft 112 to the fingers 146, 148. Similarly, the actuating member 134 includes a pair of parallel fingers 150, 152 cooperable with the fingers 146 and 148, respectively, of the arm 131 to clamp reinforcing rods 111 therebetween. To receive the reinforcing rods 111 and prevent their inadvertent movement once they are placed between the fingers and until the fingers are closed, each of the radial fingers 146, 148 includes a pair of spaced notches 154 in its upper surface.

Vertical displacement of each of the actuating members 134 is controlled by a hydraulic motor 156 mounted upon the support blocks 130. The depending piston rod 158 of this motor 156 is attached by link 160 to the bottom of the actuating member 134 so that vertical displacement of the piston rod 158 results in parallel movement of the actuating member 134.

Figure 15:
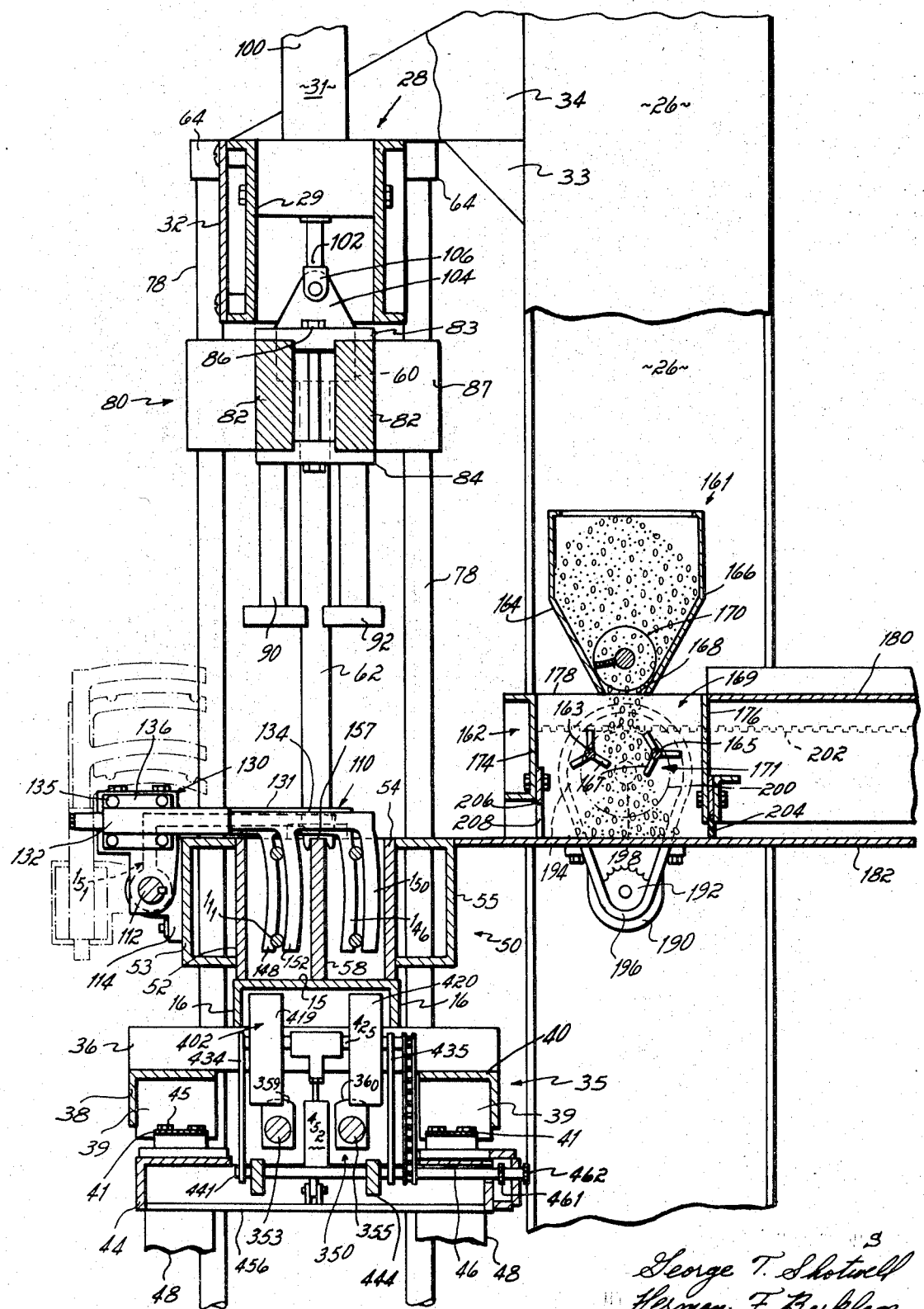
FIG. 15 is a cross-sectional view similar to FIG. 12 but illustrating the positioning of the mold box and the rod holders of the machine preparatory to filling of the mold box with concrete mix.

As best shown in FIGS. 1, 2 and 14, the shaft 112 also carries a plurality of divider wall support fingers 151. Each finger 151 is generally L-shaped with one leg 153 being nonrotatably keyed to the shaft 112. The free end 155 is slotted as at 157 to engage the top edge of the divider wall 58 when the shaft 112 is rotated to place the rods 154 into the mold box (FIG. 15). With the slot 157 located over the top edge of the divider wall, the divider wall is precluded from bowing during the filling operation, thus assuring that the opposite longitudinal sides of each precast concrete product are parallel.

Referring to FIG. 15, 16 and 17, there is illustrated the hopper 161 and feed drawer 162 for storing and transporting concrete mix to the mold box 50. The hopper 161 includes an inwardly sloping inclined front wall 164 and an inwardly inclined rear wall 166. Both of these walls 164, 166 extend between the side frame members 26 of the machine frame. The hopper has an open top through which concrete mix is poured into the hopper and an open bottom 168 through which mix is deposited into the feed drawer 162. A motor driven feed screw 170 is preferably located in the bottom of the hopper 161 to distribute concrete mix throughout the length of the hopper.

The feed drawer 162 is movable from a position beneath the hopper 161 to a position over the mold box 50 so as to transport a charge of concrete mix therebetween. It includes a channel-shaped front wall 174, rear wall 176 and side walls 178 located at the ends of the feed drawer. An apron 180 extends rearwardly from the top of the rear wall 176 between the two end walls 178 of the feed drawer. This apron functions as a hopper closure upon forward movement of the feed drawer from beneath the hopper 161.

To preclude concrete mix from falling through the open feed drawer 162 after the feed drawer is filled but before it is located over the mold box 50, a horizontal apron plate 182 is welded or otherwise secured to and between the side frame members 26.

For purposes of permitting forward and rearward movement of the feed drawer, rollers (not shown) are journalled upon stub shafts (not shown) in the side plates 178 of the feed drawer. These rollers are movable over the top surface of the apron 182.

A rotary electric motor 190 is mounted beneath and supported from the frame apron 182. This motor is operative to drive the feed drawer drive shaft 198 through a conventional chain and sprocket drive which includes a chain 196 and sprockets 192, 194. Pinions 200 located at opposite ends of the shaft 198 mesh with teeth of a rack 202 attached to the bottom of feed drawer apron 180. Thus, through the chain and sprocket drive and rack and pinion drive, rotary movement of the motor 190 is operative to move the feed drawer forwardly from a position beneath the hopper to a position over the mold box 50. After the mold box has been charged with the concrete mix from the feed drawer, the drawer may be moved rearwardly by the motor to locate it beneath the hopper 161.

In moving forward, the rear wall 176 and an attached depending heavy rubber flap 204 push the concrete mix contained within the drawer forwardly over the apron 182. The bottom of the hopper 161 is then closed by the apron 180 so that no mix spills from the hopper. Upon rearward movement of the drawer, the forward wall 174, and particularly the attached depending strike-off plate 206, is operative to strike off any excess concrete mix from the top of the mold box. As may be seen most clearly in FIGS. 16 and 17, the depending strike-off plate 206 includes slots 208 which slide over the arms 131 and 134 of the reinforcing rod supports and leg 155 of the divider wall support as the feed drawer is moved over the mold box.

In order to assist the filling of the mold box, the feed drawer 162 is provided with a pair of combination agitator and distributor assemblies 169, 171. Each of these assemblies 169, 171 includes a shaft 163, 165 which extends the full length of the feed drawer and is journalled in the feed drawer end plates 178. Extending radially from each of these shafts 163, 165 is a plurality of spaced paddles or agitators 167 which function to distribute the concrete mix throughout the width of the mold box as well as to agitate the mix so that it falls freely from the drawer 162 into the mold box 50. Preferably, the blades or paddles 167 are set at an angle of approximately 40° relative to the axis of the shafts 163, 165 so that the paddles function in the fashion of a feed screw to distribute the concrete mix away from the center of the feed drawer and toward the ends.

The shafts 163, 165 are driven in rotation from an independent motor (not shown) mounted upon the feed drawer. The motor may be either manually controlled or automatically cycled during the forward movement of the feed drawer.

The control system for operating the electrical hydraulic systems of this machine are preferably controlled from an electrical control panel 209 mounted upon the front of the cross beam assembly 28. It may, however, be controlled from a conventional automatic programming medium such as a cam shaft, a relay and switch-type circuit, etc. Since this control system is conventional and may be easily supplied by those skilled in the control arts, in the interest of brevity and clarity, it has not been illustrated or described herein.

OPERATION

A machine cycle is initiated by placing a pallet 14 upon the infeed conveyor 401 in engagement with the drive rollers 470. With a pallet resting against these drive rollers, a machine cycle may be started by actuation of a push button on the control panel 209. Actuation of this push button closes a control switch (not shown), thereby completing a first control circuit to the drive motor 464 of the conveyor and a second electrical-hydraulic control circuit to the hydraulic motors 450-453, causing the drive rollers 415-422 of the transfer section of the conveyor to be raised into an elevated position. Rotation of the drive rollers then effects infeed of the pallet 14 until the leading end of the pallet abuts against the abutment roller 482 of the stop mechanism 480. Engagement of the pallet with this roller causes the control switch 481 to be opened, thereby opening the control circuit to hydraulic motors 450-453 so that the drive rollers 415-422 are lowered and the pallet 14 lowered onto the transverse bars 36 of the machine support table 35. Simultaneously, the rotational drive to the rollers is terminated by opening of the control circuit to the drive motor 464.

The mold box 50 is then lowered by the hydraulic motor 60 so as to locate its open bottom surface in contact with the top surface 15 of the pallet 14. Reinforcing rods 111 are then manually placed in the grooves 154 of the fingers 146, 148 on the reinforcing rod supports. After the rods have been manually placed in the rod holders, the finger actuating motor 156 is actuated so as to clamp the rods between the fingers 150, 146 and 152, 148, respectively. With the rods thus clamped in the rod holders, the hydraulic motor 118 is then actuated so as to pivot the shaft 112 about its axis through an arc of approximately 90° by moving the bell crank 116 upwardly. As shown in FIG. 16, this locates the reinforcing rods within the mold box slightly above the location in which they are ultimately molded into the product. Simultaneously, rotation of the shaft 112 about its axis effects movement of the divider wall support fingers into engagement with the divider wall of the mold box.

Assuming that the hopper 161 is then full of an appropriate concrete mix, the feed drawer 162 is next moved forwardly from its rearwardmost position beneath the hopper. In moving forward, the feed drawer pushes or transports the concrete mix between the vertical wall 174, 176 of the drawer to a position over the mold box 50.

The concrete mass or mix in the hopper may be composed of a standard high grade mixture of coarse aggregate sand and pulvarized portland cement, the proportion of ingredients being determined by the required physical character of the concrete casting. The mixture is combined or mixed prior to being inserted into the hopper 161 of the machine. This mixing is done on some auxiliary equipment prior to insertion into the hopper where it is distributed throughout the length of the hopper by means of the feed screw 170. The feed screw is also operative to continuously agitate the mix so as to preclude its setting while it remains in the hopper.

As the open bottom of the feed drawer 162 is moved forwardly over the open top of the mold box 50, the concrete mix falls into the mold box so as to completely fill it. As the feed drawer moves forwardly or after it reaches the forward limit of its travel, the combination agitators, distributors 169 and 171 are actuated so as to insure that the mold box is completely filled by the loose concrete mix from the feed drawer. Since the mix falls from the front of the drawer 162, as the feed drawer moves forwardly over the mold box, the rearwardmost agitator, distributor assembly 171 forces the mix forward from the rear of the drawer to insure that the front of the mold box is filled.

The vibrating motor is driven at this time so as to rotate the vibrator shafts 353, 355 at a high speed of rotation. Vibrational movement of the pallet support causes vibrational movement of the pallet and mold box which results in the particles of the loose mixture settling downwardly into the mold box as a relatively dense mass which is reduced in volume and is substantially free of voids or cavities. The vibratory treatment forces the particles into intimate contact with the reinforcing rods and with the internal mold surfaces to create a fine surface texture. The vibratory motion occurs during the filling of the mold box so that the concrete mix partially compacts or settles around the reinforcing rods in the mold box.

Vibratory movement of the pallet supports is then stopped and the rod support motor 156 actuated so as to open the fingers of the reinforcing rod supports. The reinforcing rods and the divider wall holders are then lifted so as to locate the arms 132, 134 and rod holders in a vertical plane. Lifting of the rod supports and the divider wall holder from the mold box occurs as a result of the retraction of the piston 124 of hydraulic motor 118, thus moving the crank arm 116 downwardly so as to pivot the support arm carrying shaft 112 through an arc of approximately 90°.

The feed drawer is withdrawn after this initial vibrational treatment of the concrete mass and after opening of the reinforcing rod support fingers, but before the rod supports are lifted from the mold box. As the feed drawer returns to beneath the hopper 161, the rubber flap 204 of the front 176 of the feed drawer strikes off the top of the filled mold box 50.

If desired, the vibrator motor may be further actuated so as to complete the compaction of the concrete mass. After the vibrator unit has been activated for a sufficient period of time to compact the charge of concrete, the ramming cycle is initiated by the operator first pulling upon actuator bar 75 so as to release the safety latch lever 71 from the stripper ram 80. Thereafter, the proper switches are actuated so as to cause the motors 31 to move the combination stripper ram to the lowered position of FIG. 18 so as to engage the smooth bottom of the pads 92 with the upper surface of the partially compacted concrete mass in the mold box. The ram head exerts a downward pressure upon the concrete mass within the mold box to compress it further, bringing it to its final shape and size. The vibrator motor is operated during the pressing or ramming cycle of the machine since the vibrator impulses greatly reduce the frictional resistance of the concrete particles and thereby facilitate relative movement of the particles in response to downward pressure imposed by the ram head. In actuality, most of the compaction occurs as a result of the vibratory motion of the pallet support 35. The ram operates primarily to size as well as finish the top surface of the concrete product contained within the mold box.

When the stops 240 which are attached to the stripper ram assembly engage the stops 244 of the pallet support table 35, a control circuit is operative to stop the vibratory motor automatically either immediately or after some predetermined time delay. Thus, the final product produced upon the machine is always consistently of the same size. If the vibration were to continue for some random or undetermined time after completion of the downward movement of the ram, the vibrational movement would result in further compaction of the concrete mass with the result that the product formed within the mold would be undersized. The automatic cutoff of the vibratory motor in response to the completion of the downward movement of the ram, of course, precludes the production of such an undersized product. Additionally, the fact that a circuit must be completed through positive stops to the ram before the vibratory control circuit is opened insures that both ends of the product are of the same height before the vibratory movement is stopped.

If desired, indicator lamps may be connected in the control circuit to indicate when each of the stops 240 engages its respective stop 244 so that if one stop is consistently engaged first, the condition may be corrected by leveling the ram, refilling one end of the hopper, etc.

With the newly cast product firmly held against the pallet by pads 92, the operator or the automatically cycling circuit actuates fluid motor 60 to lift or strip the mold box 50 upwardly from the products, as illustrated in FIG. 19. It will be noted that the inside dimensions of the mold box are slightly greater than the pads 92 for clearance between the two as the mold box is lifted upwardly. During this operation, the stationary pads 92 act as a stripper head, effectively resisting the upward force of the mold box as developed by friction between the mold and the preformed products.

After the mold box has been raised to the position in FIG. 19, the operator may then elevate the mold box as well as the ram stripper assembly 80 to the fully elevated position of FIG. 20. Thereafter, the pallet with the precast concrete resting thereon is free to be moved out of the machine since the pallet stop roller 482 is located beneath the pallet as shown in FIG. 10 as a consequence of being moved downwardly by the mold box pusher bar 500. The pallet conveyor then may be actuated so as to drive the pallet and precast product out of the machine while simultaneously feeding the following pallet into the machine.

While only a single embodiment of the invention machine of this application has been illustrated and described herein, those persons skilled in the arts to which this invention pertains will readily appreciate numerous changes and modifications which may be made without departing from the spirit of our invention. Therefore, we do not intend to be limited except by the scope of the appended claims.

Having described our invention, we claim:

1. A machine for forming precast concrete structural members, comprising:
   a supporting frame including at least two vertical guide posts located at opposite ends of said machine,
   a relatively long slender mold box having an open bottom and an open top, said box being mounted for vertical movement relative to said machine frame,
   a vibratable pallet support resiliently mounted upon said machine frame below said mold box,
   means for moving said mold box between a lowered position with the open bottom in contacting relation with a pallet on said pallet support and a raised position above and remote from said pallet support, a combination ramming head and stripper plate assembly on said frame above said mold box, said assembly being movable vertically relative to said frame, said assembly including a plate dimensioned to be received through the open top of said mold box, means for moving said plate between a lowered position within said mold box and a raised position above said mold box, the improvement which comprises:

a pair of mold box support slides, each of said slides being vertically movable over one of said guide posts, and means supporting said mold box upon said slides for vertical movement independently of said slides, said means for supporting said mold box comprising a platform extending inwardly from each of said slides, said mold box being located between and resting upon the top of each of said platforms, and a vertical slide interfit on each of said slides and the end of said mold box to enable said mold box to be moved vertically independenty of said slides.

2. The machine of claim 1 wherein said mold box includes a divider wall mounted interiorly of said box and extending longitudinally thereof for dividing said box into at least two longitudinal molding chambers and a divider wall holder attached to and movable with said mold box, said holder being movable from a position out of engagement with said divider wall to a position in which said holder engages and supports said divider wall against deflection while said box is filled with concrete mix.

3. The machine of claim 1 wherein said divider wall holder is pivotally mounted upon said mold box and further includes a motor for moving said holder between said positions.

4. The machine of claim 1 wherein a plurality of divider wall holders are mounted upon said mold box, each of said holders being secured to a rotatable shaft so as to rotate with said shaft upon movement of said shaft by said motor.

5. The machine of claim 4 which further includes a plurality of reinforcing rod holders attached to said rotatable shaft so as to be pivotally movable with said shaft and vertically movable with said mold box, said rod holders being operable to support reinforcing rods in said mold box while said box is filled with concrete mix.

6. A machine for forming precast concrete structural members, comprising:

a supporting frame, a relatively long, slender mold box extending longitudinally of said frame and having an open bottom and an open top, said box being mounted for vertical movement relative to said machine frame, a vibratable pallet support located below said mold box, resilient means connecting said pallet support to said machine frame, means for moving said mold box between a lowered position with the open bottom in contacting relation with a pallet on said pallet support and a raised position above and remote from said pallet support, a combination ramming head and stripper plate assembly on said frame above said mold box, said assembly being movable vertically relative to said frame, said assembly including a plate dimensioned to be received through the open top of said mold box, means for moving said assembly vertically between a lowered position in which said plate is located within said mold box and a raised position in which said plate is above said mold box, the improvement wherein said resilient means is operable to limit vibrational movement of said pallet support to a vertical direction and includes a plurality of longitudinally extending cantilever springs connected at one point to said supporting frame and connected at another second point to said vibratable pallet support, said second point being longtudinally spaced from said one point.

7. The machine of claim 6 wherein said springs are connected to said pallet support by passage through slots in depending lugs of said support so as to enable said springs to slide transversely relative to said support lugs.

8. The machine of claim 7 wherein said cantilever spring are fixed connected to said frame adjacent one end of the spring.

9. The machine of claim 7 wherein said springs are fixedly connected to said frame medially of the ends of said springs.

10. The machine of claim 7 wherein some of said springs are fixedly connected at one end to said frame and others of said springs are fixedly connected to said frame medially of the length of said springs.

11. The machine of claim 1 which further comprises conveyor means for transporting pallets into and out of said machine, said conveyor means including a stop for locating a pallet in said machine, and an elevator for lowering a pallet after engagement with said stop onto said vibratable pallet support and for lifting said pallet off of said support after a molding cycle of said machine.

12. The machine of claim 11 wherein said elevator comprises a series of rollers mounted upon movable brackets, and a plurality of hydraulic motors for raising and lowering said brackets.

13. The machine of claim 11 wherein said pallets are moved in a single direction during movement into and out of said machine on said conveyor and wherein said stop comprises an arm having an abutment attached to one end and engageable by pallets on said conveyor, said arm being supported for pivotal movement about both a horizontal and vertical axis so as to enable said abutment to be moved downwardly and under a pallet on said conveyor during a molding cycle of said machine preparatory to movement of said pallet out of said machine on said conveyor.

14. The machine of claim 11 wherein said stop is engageable with a switch operable to control operation of a drive mechanism of said conveyor.

15. The machine of claim 13 wherein said arm is biased by a spring into a blocking position relative to pallets on said conveyor and is movable out of said blocking position by engagement of a portion of said mold box with said arm.

16. The machine of claim 11 wherein said supporting frame comprises two pairs of stationary posts, one of said pair of posts being located at each end of said machine, said conveyor extending between each pair of said posts so that a pallet passes between one pair of posts as it is transported on said conveyor into said machine and passes between the other pair of posts during movement on said conveyor out of said machine.

17. The machine of claim 6 which further includes means for effectihg vibratory movement of said pallet support including a pair of parallel shafts rotatably mounted on the bottom of said pallet support, a pair of spur gears nonrotatably keyed to each of said shafts, said gears being in mating engagement so that rotation of one gear in one direction, effects rotation of the other gear in the opposite direction, a plurality of eccentric weights mounted upon each of said shafts, and means for driving at least one of said shafts in rotation so as to effect rotation of both of said shafts and consequent vibratory movement of said pallet support.

18. The machine of claim 17 wherein said shafts are rotatably mounted within a plurality of longitudinally spaced cross bars secured to the bottom of said pallet support, said eccentric weights being longitudinally positioned on said shafts so as to be located in juxtaposition to opposite sides of said cross bars.

19. The machine of claim 6 wherein said mold box includes a divider wall mounted interiorly of said box and extending longitudinally thereof for dividing said box into at least two longitudinal molding chambers and
a divider wall holder attached to and movable with said mold box, said holder being movable from a position out of engagement with said divider wall to a position in which said holder engages and supports said divider wall against deflection while said box is filled with concrete mix.

20. The machine of claim 17 wherein said mold box includes a divider wall mounted interiorly of said box and extending longitudinally thereof for dividing said box into at least two longitudinal molding chambers and
a divider wall holder attached to and movable with said mold box, said holder being movable from a position out of engagement with said divider wall to a position in which said holder engages and supports said divider wall against deflection while said box is filled with concrete mix.

21. The machine of claim 6 which further includes conveyor means for transporting pallets into and out of said machine, said conveyor means including a stop for locating a pallet in said machine, and
an elevator for lowering a pallet after engagement with said stop onto said vibratable pallet support and for lifting said pallet off of said support after a molding cycle of said machine.

22. The machine of claim 17 which further includes resilient means connecting said support to said machine frame, said resilient means including a plurality of cantilever springs connected at one point to said supporting frame and connected at another point to said vibratable pallet support.

23. The machine if claim 22 wherein said springs are connected to said pallet support by passage through slots in depending lugs of said support so as to enable said springs to slide transversely relative to said support lugs.

24. The machine of claim 23 wherein said supporting frame includes at least two vertical guide posts located at opposite ends of said machine,
a pair of mold box supporting slides, each of said slides being vertically movable over one of said guide posts, and
means supporting said mold box upon said slides for vertical movement independently of said slides.

25. The machine of claim 24 wherein said means for supporting said mold box comprises a platform extending inwardly from each of said slides, said mold box being located between and resting upon the top of each of said platforms, and a vertical slide interfit on each of said slides and the ends of said mold box to enable said mold box to be moved vertically independently of said slides.

26. The machine of claim 1 wherein said frame includes two guide posts located at each end of the machine, each of said mold box supporting slides being vertically movable over one pair of said guide posts.

27. A machine for forming precast concrete structural members, comprising:
a supporting frame,
a relatively long, slender mold box having an open bottom and an open top, said box being mounted for vertical movement relative to said machine frame,
a vibratable pallet support resiliently mounted upon said machine frame below said mold box,
means for effecting vibratory movement of said pallet support,
means for moving said mold box between a lowered position with the open bottom in contacting relation with a pallet on said pallet support and a raised position above and remote from said pallet support,
a combination ramming head and stripper plate assembly on said frame above said mold box, said assembly being movable vertically relative to said frame, said assembly including a plate dimensioned to be received through the open top of said mold box,
means for moving said plate between a lowered position within said mold box and a raised position above said mold box,
the improvement which comprises conveyor means for transporting pallets into and out of said machine, said conveyor means including a stop for locating a pallet in said conveyor and
an elevator for lowering a pallet after engagement with said stop onto said vibratable pallet support and for lifting said pallet off of said support after a molding cycle of said machine.

28. A machine for forming precast concrete structural members, comprising:
a supporting frame,
a relatively long, slender mold box having an open bottom and an open top, said box being mounted for vertical movement relative to said machine frame,
a vibratable pallet support resiliently mounted upon said machine frame below said mold box,
means for effecting vibratory movement of said pallet support,
means for moving said mold box between a lowered position with the open bottom in contracting relation with a pallet on said pallet support and a raised position above and remote from said pallet support,
a combination ramming head and stripper plate assembly on said frame above said mold box, said assembly being movable vertically relative to said frame, said assembly including a plate dimensioned to be received through the open top of said mold box,
means for moving said plate between a lowered position within said mold box and a raised position above said mold box, the improvement wherein said means for effecting vibratory movement of said pallet support comprises
a pair of parallel shafts rotatably mounted upon the bottom of said pallet support,
a pair of spur gears nonrotatably keyed to each of said shafts, said gears being in mating engagement so that rotation of one gear in one direction effects rotation of the other gear in the opposite direction,
a plurality of eccentric weights mounted upon each of said shafts,
means for driving at least one of said shafts in rotation so as to effect rotation of both of said shafts and consequent vibratory movement of said pallet support,
conveyor means for transporting pallets into and out of said machine, said conveyor means including a stop for locating a pallet in said conveyor, and
an elevator for lowering a pallet after engagement with said stop onto said vibratory pallet support and for lifting said pallet off of said support after a molding cycle of said machine.

29. A machine for forming precast concrete structural members, comprising:
a supporting frame including at least two vertical guide posts located at opposite ends of said machine,
a relatively long, slender mold box having an open bottom and an open top, said box being mounted for vertical movement relative to said machine frame,
a vibratable pallet support resiliently mounted upon said machine frame below said mold box,
means for moving said mold box between a lowered position with the open bottom in contacting relation with a pallet on said pallet support and a raised position above and remote from said pallet support,
a combination ramming head and stripper plate assembly on said frame above said mold box, said assembly being movable vertically relative to said frame, said assembly including a plate dimensioned to be received through the open top of said mold box, means for moving said plate between a lowered position within said mold box and a raised position above said mold box, said mold box including a divider wall mounted interiorly of said box and extending longitudinally thereof for dividing said box into at least two longitudinal molding chambers, the improvement which comprises:

a divider wall holder attached to and movable with said mold box, said holder being movable from a position out of engagement with said divider wall to a position in which said holder engages and supports said divider wall against deflection while said box is filled with concrete mix.

30. The machine of claim 29 wherein said divider wall holder is pivotally mounted upon said mold box and further includes a motor for moving said holder between said positions.

31. The machine of claim 29 wherein a plurality of divider wall holders are mounted upon said mold box, each of said holders being secured to a rotatable shaft so as to rotate with said shaft upon movement of said shaft by said motor.

32. The machine of claim 31 which further includes a plurality of reinforcing rod holders attached to said rotatable shaft so as to be pivotally movable with said shaft and vertically movable with said mold box, said rod holders being operable to support reinforcing rods in said mold box while said box is filled with concrete mix.

References Cited

UNITED STATES PATENTS

| | | | |
|---|---|---|---|
| 1,776,732 | 9/1930 | Johnson | 267—41X |
| 2,054,253 | 9/1936 | Horsch | 25—41X |
| 3,407,458 | 10/1968 | Reckman et al. | 25—41 |
| 3,074,239 | 1/1963 | Mustard | 248—125X |

FOREIGN PATENTS

| | | |
|---|---|---|
| 794,176 | 12/1935 | France. |
| 922,389 | 1/1947 | France. |

J. SPENCER OVERHOLSER, Primary Examiner

R. S. ANNEAR, Assistant Examiner

PO-1050
(5/69)

UNITED STATES PATENT OFFICE
CERTIFICATE OF CORRECTION

Patent No. 3,553,798          Dated February 25, 1971

Inventor(s) A. C. Reckman et al

It is certified that error appears in the above-identified patent and that said Letters Patent are hereby corrected as shown below:

Column 7, line 41, after "base" change "81" to -- 21 --.

Column 14, line 59 (Claim 17, line 2), "effectihg" should be -- effecting --.

Column 15, line 32 (Claim 22, line 2), insert -- pallet -- after "said" and before "support".

Signed and sealed this 8th day of June 1971.

(SEAL)
Attest:

EDWARD M. FLETCHER, JR.
Attesting Officer

WILLIAM E. SCHUYLER, J
Commissioner of Patent